United States Patent [19]

Andruet

[11] Patent Number: 5,004,061

[45] Date of Patent: Apr. 2, 1991

[54] ELECTRICALLY POWERED MOTOR VEHICLE

[76] Inventor: Jean-Claude Andruet, S.C. Michèle Béroud, Portigliolo, 20138 Coti Chiavari, France

[21] Appl. No.: 359,143

[22] Filed: May 31, 1989

[30] Foreign Application Priority Data

May 31, 1988 [FR] France .................. 88 07243

[51] Int. Cl.$^5$ .............................................. B60K 1/00
[52] U.S. Cl. .................... 180/65.5; 180/65.6
[58] Field of Search ............... 180/65.1, 65.5, 65.6, 180/65.7, 233, 234, 237, 244; 280/688, 690, DIG. 5

[56] References Cited

U.S. PATENT DOCUMENTS

| | | | |
|---|---|---|---|
| 3,161,249 | 12/1964 | Bouladon et al. | 180/65.5 |
| 3,899,041 | 8/1975 | Mager | 180/65.1 |
| 4,042,055 | 8/1977 | Ward | 180/65.1 |

FOREIGN PATENT DOCUMENTS 2592342  7/1987  France .
1396416  6/1975  United Kingdom .

*Primary Examiner*—Andres Kashnikow
*Assistant Examiner*—Richard Camby
*Attorney, Agent, or Firm*—Cushman, Darby & Cushman

[57] ABSTRACT

A motor vehicle includes two wheel and axle sets, one in front and one in the rear, at least one of which is driven and at least one of which steers. The power to the vehicle is assured by an on-board source of electrical energy. Each wheel of each driven set is equipped with an electrical back-geared motor assembly supplied by the source of electrical energy, the motor assembly being connected to a chassis of the vehicle by two suspension triangles articulated on one side on the motor assembly and on another side on the chassis, the output shaft of the assembly including the axle of the corresponding wheel.

13 Claims, 5 Drawing Sheets

ELECTRICALLY POWERED MOTOR VEHICLE

FIELD OF THE INVENTION

The invention relates to an electrically powered motor vehicle that can be used in particular as a golf cart.

BACKGROUND OF THE INVENTION

As is well known, golf courses cover very large areas, and the distances the players must cover to complete a round of golf can be considered excessive by certain players, especially those who must carry all their golf equipment over the entire course. Accordingly, the proposal has been made to provide golfers with small motor vehicles, which are powered electrically to avoid any atmospheric pollution or any nuisance from noise. These vehicles must have particular characteristics, and in particular must be drivable over uneven terrain, which means that they must necessarily be provided with a differential between the wheels of the driven wheel and axle set. Moreover, to lend these vehicles good characteristics for operation over uneven terrain, it would be desirable to have vehicles with independent wheels, with four-wheel drive. With conventional techniques of motor vehicle construction, it is quite possible to meet the above criteria, but unfortunately such golf carts are very expensive, and so in general, to keep the cost to a reasonable level, one is forced to accept less satisfactory characteristics than what would be ideal.

OBJECT AND SUMMARY OF THE INVENTION

The object of the present invention is to propose an electrically powered motor vehicle usable as a golf cart, with a moderate cost yet nevertheless having extremely satisfactory characteristics for operation over uneven ground. According to the invention, it is proposed that a back-geared motor assembly be associated with each wheel of the vehicle, thus making the four wheels of the vehicle capable of being driven and steered. The low cost is due to the fact that a mechanical differential is no longer required, and that the differential effect can be obtained by way of the electrical supply to the motor. Moreover, all the back-geared motor assemblies associated with all of the wheels of the vehicle can be identical in structure, which reduces the cost.

Consequently, the subject of the present invention is a motor vehicle including at least two wheel and axle sets, one in front and one in the rear, at least one of which is driven and at least one of which steers, the power to the vehicle being assured by an on-board source of electrical energy, characterized in that each wheel of the driven set (or sets) is equipped with an electric back-geared motor assembly supplied by the source of electrical energy; the assembly is connected to the chassis of the vehicle by two suspension elements articulated on the assembly on one side and on the chassis on the other, and the output shaft of the assembly comprises the axle of the corresponding wheel.

In a preferred embodiment, each wheel and axle set includes two wheels that are symmetrical with respect to the median longitudinal plane of the vehicle, and the suspension elements are suspension triangles. Advantageously, a driven wheel and axle set is also a steering set, the articulation of the suspension triangles on the assembly being a ball, and the articulation of the suspension triangles on the chassis being a shaft substantially parallel to the longitudinal axis of the vehicle; the assembly is joined to a steering device at a point not located on the straight line joining the centers of the two balls. More particularly, it is preferred that the two wheel and axle sets are both driven and both steer.

It is naturally possible to provide a braking device disposed between the wheel and the gear box of the back-geared motor assembly, one of the elements of the device being integrally joined to the gear box and the other being integrally joined with the wheel axle, with a braking system disposed between the two aforementioned elements. The balls articulating the suspension triangles on the assembly may be supported by the gear box of the reduction gear of the back-geared motor assembly.

Advantageously, the on-board source of electrical energy is a battery, and in that case the motor of a back-geared motor assembly is a direct current motor; this motor may be a motor with an armature coil rotor, with the inductor stator including permanent magnets.

To attain the differential effect, it is possible, in a first variant, to provide that the steering box of the vehicles, maneuvered by the driver, controls an electronic unit including two identical sub-assemblies assigned to one of the two right wheels and the other to the two left wheels of the vehicle, one of the two sub-assemblies furnishing an electrical supply, in cornering on the inside wheels, that is increasingly reduced, the more accentuated the cornering, while the other maintains an electrical supply on the outer wheels corresponding to driving straight ahead. In this way, depending on the angle of rotation of the steering wheel, the inside wheels when cornering are given a reduced supply of power in a given proportion, the rate of reduction being a function of the radius of curvature of the curve in cornering and being programmed in advance.

In another variant embodiment, the two motors of the same wheel and axle set are supplied with power in series; in that case, if the vehicle is driven around a corner, one of the motors of each set is driven at a higher speed than that which it has when the vehicle was driving in a straight line; as a result, since the current through the two series-connected motors is the same, the other motor is obliged to rotate less fast, since the sum of the two electromotive forces of the two motors is constant, and that of the first motor has increased with the increase in the speed of rotation. Hence it can be seen that this particular connection of the motors makes an automatic differential effect obtainable. As a result, such an assembly is quite economical.

It may optionally be provided that a connection is made between the two median points located between the two series-connected motors of the same wheel and axle set. In that case, if one of the wheels of the vehicle rotates idly, the wheel diagonally opposite experiences an increase in its drive torque, which pivots the vehicle and facilitates clearing the ground and resuming contact with the ground on the part of the wheel that is rotating idle. This connection may optionally be provided to be effected only by a special maneuver on the part of the driver.

In this variant, where the motors of the same wheel and axle set are supplied in series, the supply to the motors may advantageously be effected via a plurality of transistors connected in parallel, the conduction of the transistors being simultaneous and being controlled at a frequency $F$ for a fraction $\tau$ of the control period 1/F, τ being between 0 and 1 and being a function that increases with the control of the vehicle accelerator.

In a third variant embodiment of the invention, corresponding to an improvement to the aforementioned second variant, the rotor windings are made to short-circuit during the fraction (1-τ) of the control period when the supply to motors is cut off. In this way, because of the short-circuiting of the rotor windings, a motor brake effect is attained, which is the more pronounced, the shorter the period of time in which the motors are supplied in each period. The presence of this kind of motor braking is particularly agreeable from the standpoint of driving the vehicle according to the invention. It may for instance be provided that the short-circuiting of the rotor windings be effected by means of at least one transistor, which is conducting in phase opposition with respect to the transistors that assure the power supply.

The invention relates equally to the use of a vehicle, such as that defined above, as a golf cart.

For better comprehension of the subject of the invention, several embodiments shown in the accompanying drawing will now be described, solely as an illustrative and non-limiting example.

DESCRIPTION OF THE PREFERRED EMBODIMENTS

Figure 1:
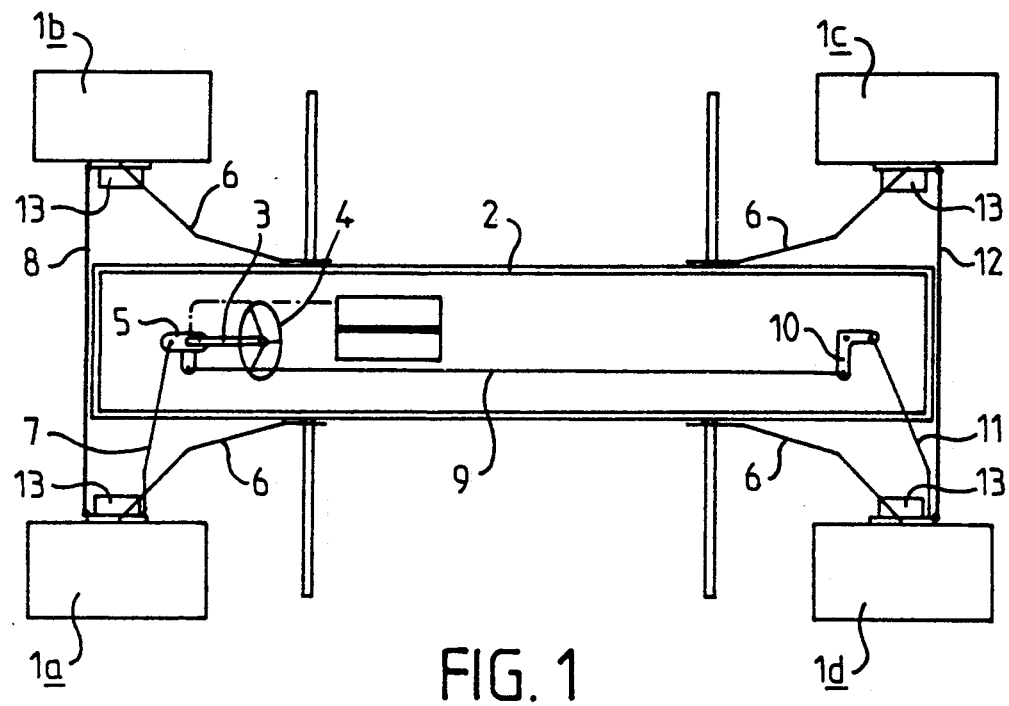
FIG. 1 is a schematic plan view of a first variant embodiment of a golf cart according to the invention.
Figure 3:
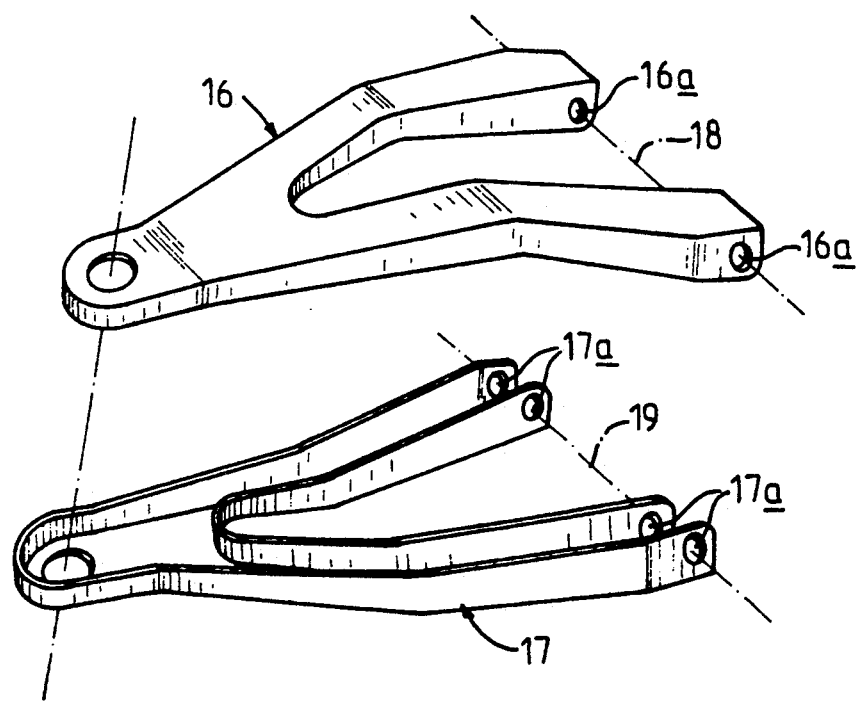
FIG. 3 is a perspective view of the two suspension triangles associated with the wheel of FIG. 2.

Turning now to the drawings, it can be seen that the four wheels of a golf cart are identified as 1a, 1b, 1c, 1d, and the chassis 2 of the cart has a steering column 3 maneuvered by a steering wheel 4. The steering column 3 controls a steering box 5. Each wheel is connected to the chassis 2 by a suspension means 6, schematically represented in FIG. 1 but shown in detail in FIGS. 2A, 2B and 3. Each wheel is steered by the box 5; this control is indicated by reference numeral 7 for the front wheel 1a, and the steering of the other front wheel 1b is obtained by a front transverse binding-bar 8; via a linkage 9, the box 5 maneuvers a pivoting square 10 placed at the level of the rear wheels; the square 10 controls the wheel 1d of the rear wheel and axle set via the mechanical linkage 11, and the orientation is communicated to the wheel 1d via the rear transverse drawbar 12. It is thus clear that this vehicle has independent four-wheel steering.

To communicate a movement to this vehicle, an electrical back-geared motor assembly 13 is used on each wheel, integrally joined to the wheel, and its output shaft comprises the axle of the wheel. The electrical supply is assured by an on-board battery in the vehicle.

Each back-geared motor assembly 13 comprises a direct current electrical motor 13a and a reducing gear 13b. The outer gear box of the reducing gear 13b has a ball, 14 and 15, respectively, on its upper and lower portions. The balls 14 and 15 comprise the attachment points on the upper and lower suspension triangles 16 and 17, respectively; the side of these suspension triangles opposite the balls 14 and 15 is articulated on the vehicle chassis along axes 18 and 19, respectively. Each suspension triangle 16 and 17 comprises two arms that converge toward the attachment point of the balls 14 and 15, respectively, and the end of the two arms opposite the ball serve to provide articulation on the chassis 2 along the axes 18 and 19, respectively, and hence include holes for pivot shafts 16a and 17a. In the drawing, the springs and shock absorbers of the suspension have not been shown, but they are located in the manner well known in the state of the art. The line joining the centers of the balls 14, 15 is parallel to the plane defined by the pivot shafts 18 and 19, such that when the suspension triangles 16 and 17 bottom out with respect to the chassis, the line joining the centers of the balls 14, 15 remains parallel to a fixed plane; this makes it possible to keep the axis of the back-geared motor assembly 13 substantially parallel to the ground.

Figure 2A:
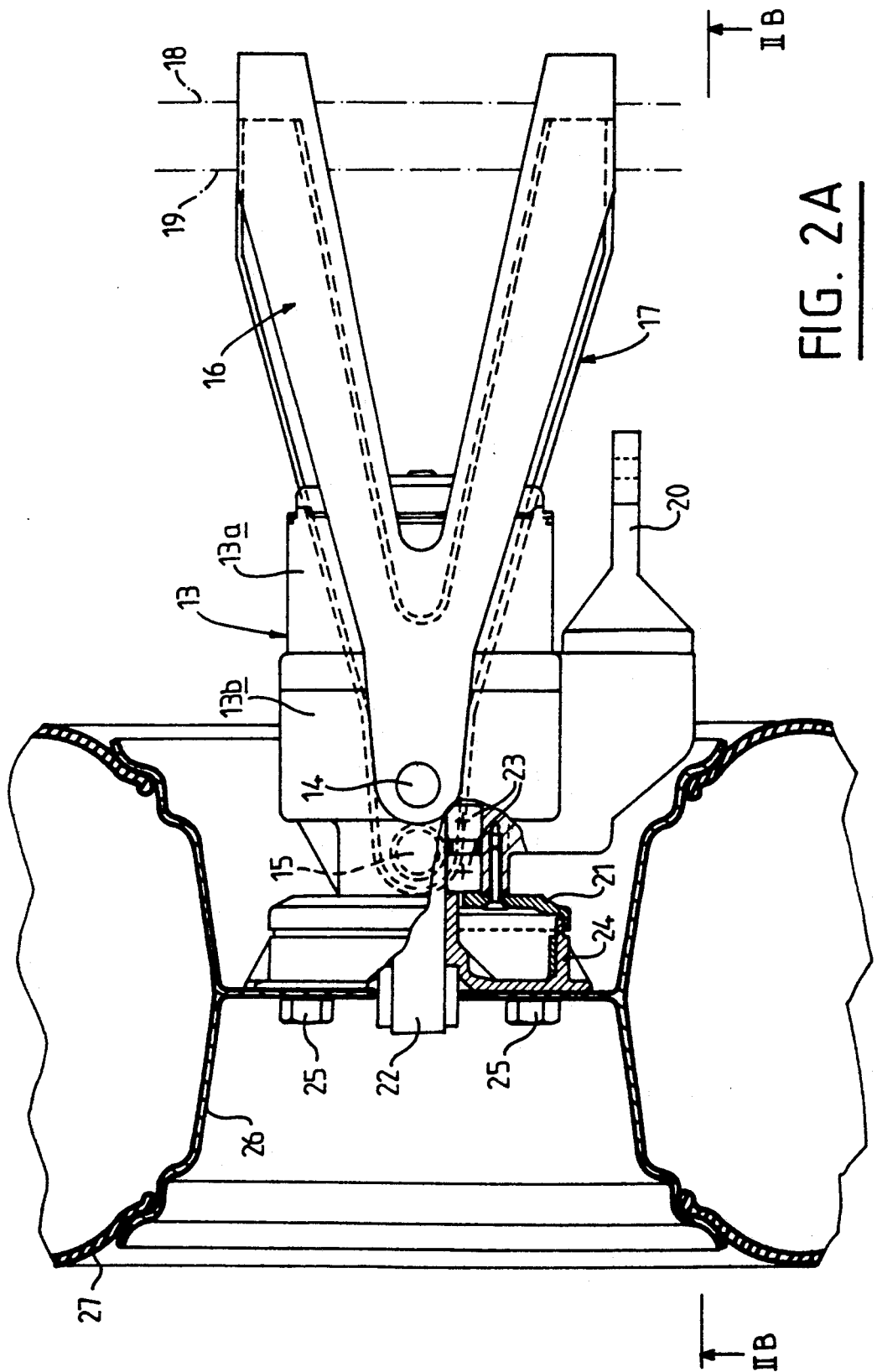
FIG. 2A is a plan view of a wheel of the cart of FIG. 1, partially cut away.
Figure 2B:
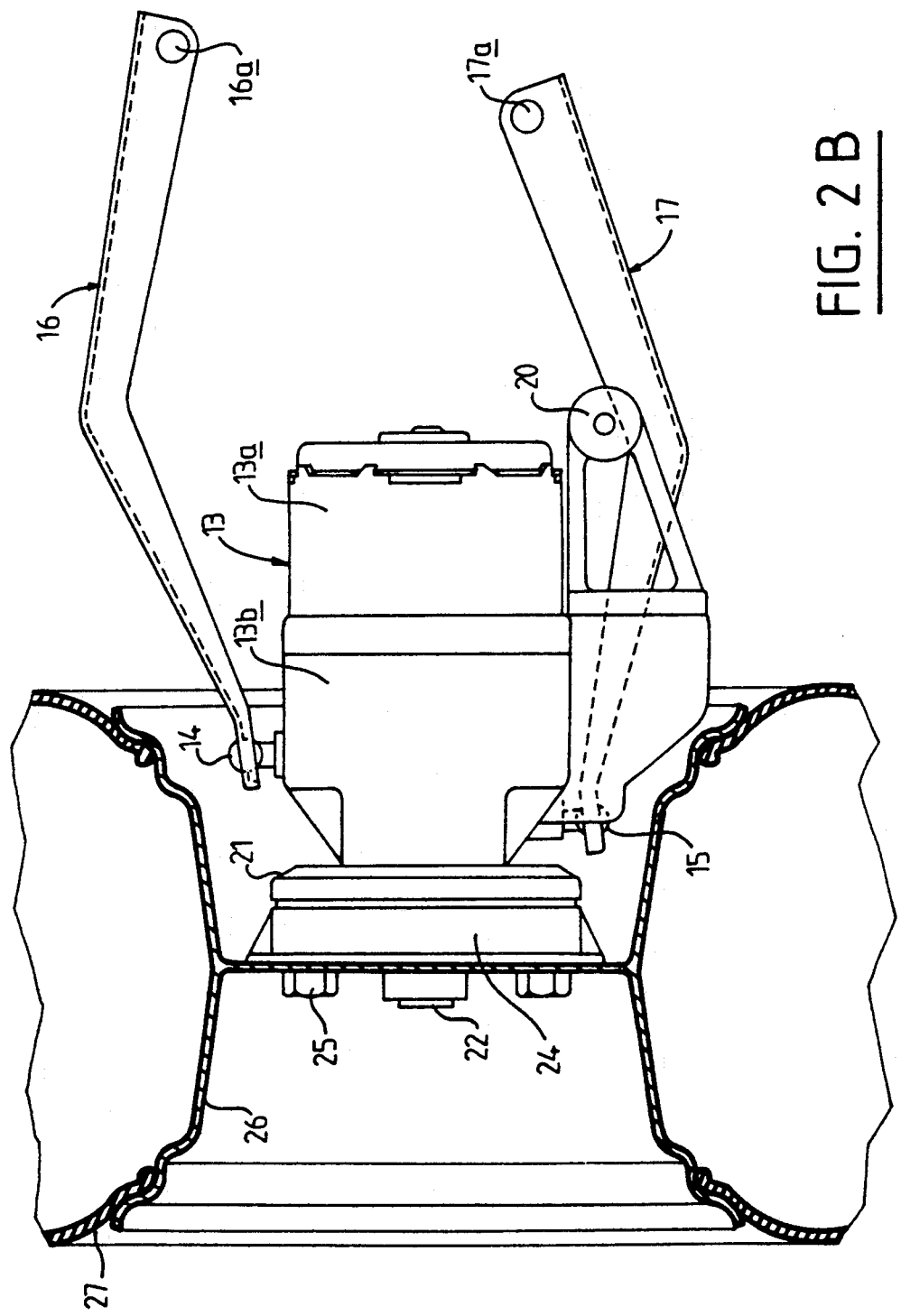
FIG. 2B is a lateral elevation view of the wheel of FIG. 2A along the line IIB—IIB of FIG. 2A.
Figure 4:
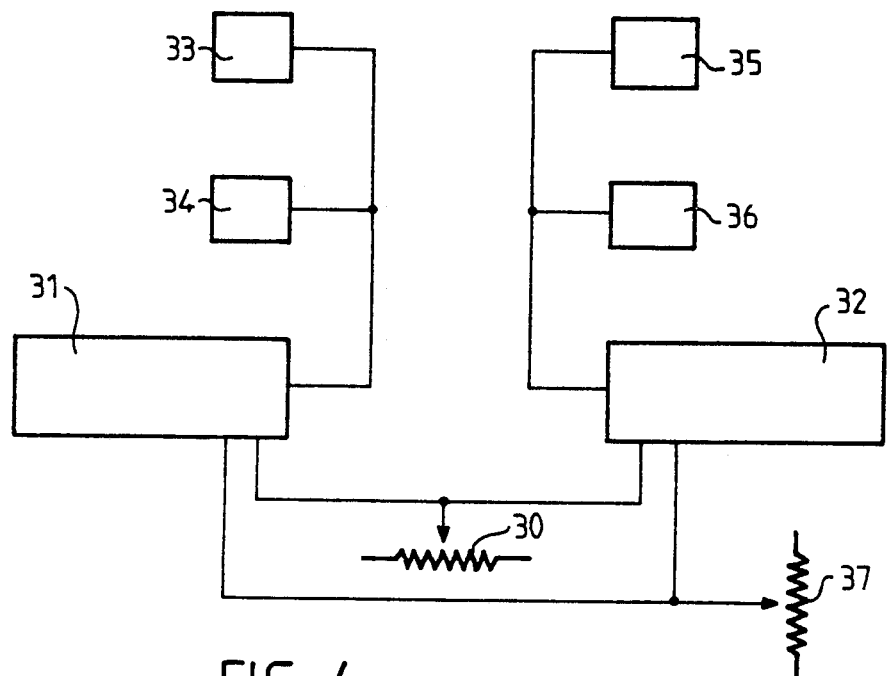
FIG. 4 is a block diagram of the electronic control circuit assuring the differential function for the vehicle of FIG. 1.

As has been noted above, the wheels 1a and 1d are steered from the steering box 5. This control is effected by providing a lug 20 integrally joined with the gear box of the reducing gear 13b and disposed in a plane substantially parallel to the plane defined by the line between the centers of the balls 14, 15, on the one hand, and the axis of the back-geared motor assembly 13, on the other. A steering rod assembly, not shown in FIGS. 2A and 2B, is hooked onto the lug 20. In this way, by acting upon this rod assembly, the shaft of the back-geared motor 13 can be made to pivot about the axis defined by the centers of the two balls 14 and 15, which makes it possible to orient the wheel. For the wheels 1b and 1c, the control rod assembly that comes to cooperate with the lug 20 is the transverse drawbar 8 or 12, respectively.

A plate 21 disposed concentrically about the output shaft 22 of the back-geared motor is fixed to the gear box of the reducing gear 13b; the output shaft 22 is supported in a known manner in the gear box of the reducing gear 13b by roller bearings 23. A movable flange 24 is fixed to the output shaft 22; the plate 21 carries braking devices (not shown) which cooperate with the movable flange 24 in a known manner; the manner of illustration used in FIGS. 2A and 2B corresponds to a system of shoe brakes, but a disk braking system may certainly be used instead. A wheel rim 26 that supports a tire 27 is fixed with bolts 25 to the movable flange 24.

It can be seen that the vehicle described above includes four steerable wheels with independent suspension, each of these wheels being driven, since the wheel axle is the output shaft of a back-geared motor 13. Naturally, it can be provided that the rear wheel and axle set of the vehicle is not steered. Nevertheless, in all cases, it would be necessary to provide suitable matching of the electrical power to the back-geared motors associated with the four wheels as a function of the path of the vehicle. For straight-ahead travel, the speeds of rotation of the axles 22 of the four wheels must be the same; contrarily, for cornering, a differential effect must be achieved, so that for one wheel and axle set, the speed of rotation of the inner wheel in cornering will be less than the rotational speed of the outer wheel.

To obtain the desired differential effect, the invention proposes several variant embodiments.

The first variant is schematically shown in FIGS. 1-4. In this variant, the steering box 5, via a potentiometer 30, controls two identical electronic variable-speed drive units 31 and 32; at the output of the variable-speed drive unit 31, the motors of the front and rear left wheels of the vehicle are connected in parallel; the front and rear right motors of the vehicle are connected in parallel to the output of the electronic variable speed drive unit 32. It is understood that these motors are the same ones identified in the above description by reference numerals 13A; however, for the sake of clarity, the detailed description of this variant and that for the next two variants to be described uses different reference numerals for each of these motors; hence, reference numerals 33 and 34 identify the front and rear left motors, respectively, and 35 and 36 identify the right front and rear motors, respectively. Depending on the rotation of the steering wheel of the vehicle, the steering box 5 displaces the indicator of the rheostat 30 in one direction or the other, which beginning at a position of equilibrium corresponding to travel straight ahead favors one or the other of the outputs of the two units 31 and 32 in accordance with a predetermined program corresponding to the desired differential effect sought. In other words, depending on the angle of rotation of the steering wheel, which corresponds to a given radius of curvature in cornering, the difference to be set between the current supplied to the motors 33 and 34 on the one hand, and 35 and 36 on the other, is programmed. The overall speed of the vehicle is controlled by the accelerator, which acts upon a rheostat 37 regulating the intensity of the supply to the motors regardless of any reduction effected by one or the other of the variable speed units 31 or 32.

In a second variant embodiment, with which the differential effect can be obtained, it is proposed that the two motors of the same wheel and axle set of the vehicle be powered in series. The diagram of the electronic circuit making it possible to attain this variant is provided in FIG. 5; it can be seen that the reference numerals 33 and 35 are retained for the two motors at left and right front, and 34 and 36 are retained for the two motors at left and right rear, respectively. A connection has been made via a switch 40 between the midpoints between the motors 33 and 35, on the one hand, and 34 and 36, on the other. The motors 33-36 are all identical. They are armature coil rotor motors including a stator with permanent magnets; for such motors, the torque is proportional to the current. The fact that the two front motors and the two rear motors are connected in series makes it possible to obtain a differential effect automatically. In fact, if the steering wheel is turned so that the vehicle moves in a straight line, one of the motors of each wheel and axle set will turn faster than the other, such that its electromotive force will increase; given that the sum of the electromotive forces of the two motors supplied in series is necessarily constant, the other motor of the same wheel and axle set will exhibit a drop in electromotive force and hence a reduction of its speed of rotation. This automatic differential effect occurs on both wheel and axle sets of the vehicle. If the closure of the switch 40 is assured, and if one of the wheels of the vehicle rotates idle because of some unevenness of the ground, the current that is no longer absorbed by the idly rotating wheel is taken back by the motor of the diagonally opposite wheel, which provides clearance for the vehicle over rough ground.

Figure 5:
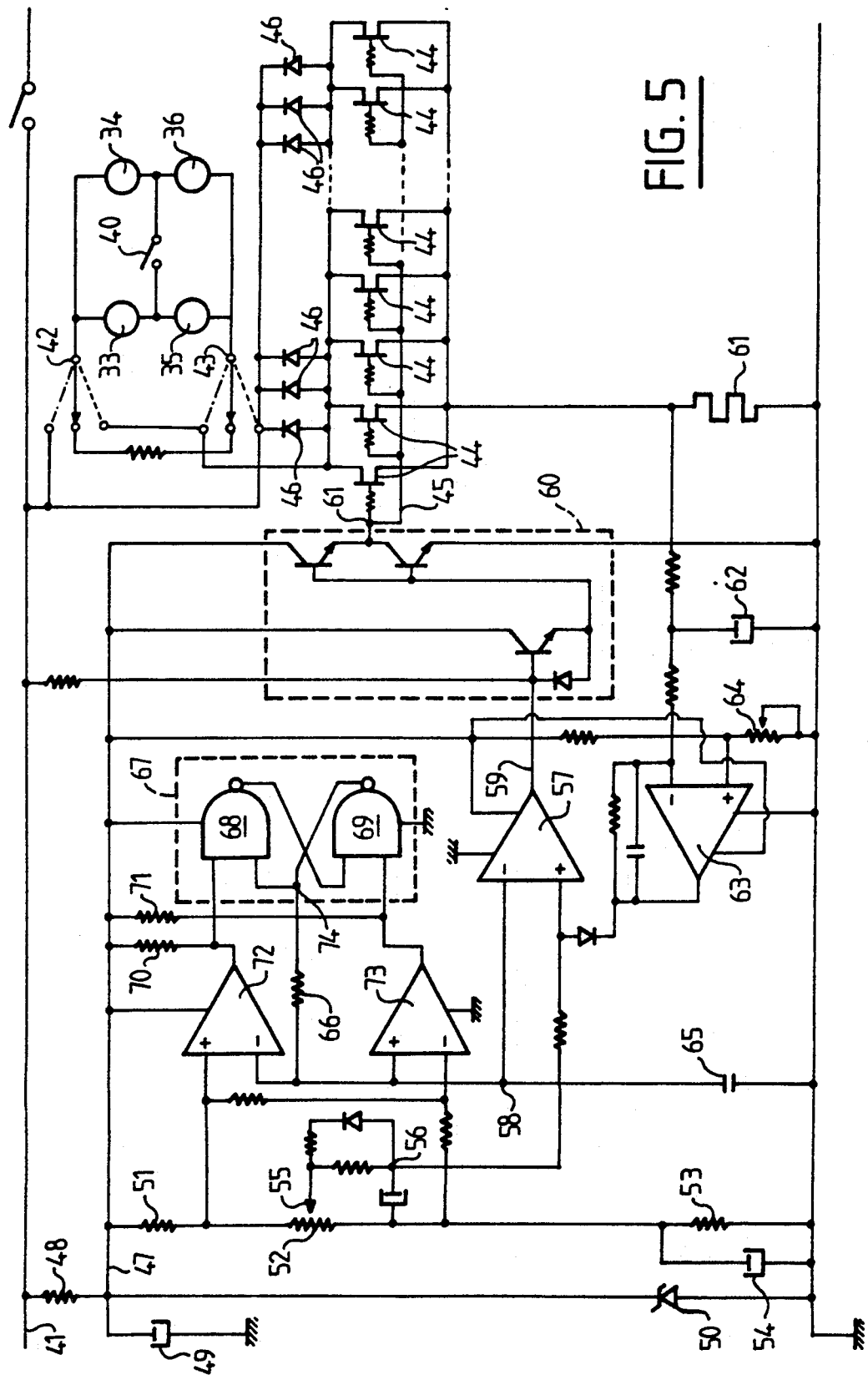
FIG. 5 is a diagram for an electronic circuit corresponding to a second variant embodiment, with which a differential effect can be obtained between the wheels of the same wheel and axle set, the two motors of the same set of wheels of the vehicle according to the invention being applied in series.

In FIG. 5, the line of positive supply of direct current at 24 V has been shown at 41; the negative terminal of the battery supplying it is connected to ground. The supply to the motors of the vehicle for travel forward or in reverse is obtained by means of switches 42 and 43, which are actuated simultaneously. In the position shown in solid lines in FIG. 5, the switches 42 and 43 are in the stopping position, since the windings of the motors are short-circuited. In the position shown in dot-dash lines, the motors are supplied for travel forward; in the position shown in dotted lines, the motors are supplied for travel in reverse. The supply is assured between the line 41, one the one hand, and a set of transistors 44 connected in parallel, on the other. A certain number of transistors 44 must be disposed in parallel, taking into account the limitations in current in these transistors and the consumption by the motors of the vehicle; if the required total consumption is 100 amperes, then at least seven MOS transistors connected in parallel must be provided, since each transistor can support only about 15 amperes. All of the transistors 44 are controlled by the voltage carried on the line 45, in such a way that these transistors will not be conducting except for a fraction of the time. In other words, the transistors 44 are master-controlled at a certain frequency, and in each period the transistors will be conducting only during a fraction of the period; by varying this fraction, a mean supply current is obtained that will be variable from 0 up to a maximum, which enables perfect regulation of the speed of travel of the vehicle by varying the fraction of the period during which the transistors 44 are conducting. The armature coils of the motors 33-36 smooth the current that was chopped because of their self-inductance, such that the output speed of the motors corresponds to the mean value of the current, which in turn is a function of the chopping rate in each period.

Diodes 46 in parallel with the terminals of the motors 33-36 are provided; there are of the Schottky diode type, and they are useful to avoid a loss of energy at each current cutoff at the output of the transistors 44. In fact, since the supply to the motors is effected by a chopped current, at each current cutoff the armature coil of the motors comprises a choke coil which discharges and must be recharged at the moment when the supply current is resumed. To avoid this discharge, a freewheel diode is provided in a known fashion; the Schottky diodes are advantageous for this purpose, because they have a low threshold and a high conduction speed.

Beginning at the line 41 supplied with 24 V, a line 47 is provided on which a stabilized voltage of 12 V is available; this is obtained by connecting the line 47 to the line 41 via a resistor 48 and by connecting the line 47 to ground via a capacitor 49 and a Zener diode 50 which are disposed in parallel. Between the line 47 and ground, three equivalent resistors 51, 52, 53 are provided, connected in series; a capacitor 54 is provided at the terminals of the resistor 53. The resistor 52 is associated with a cursor 55 to comprise a rheostat; the cursor 55 is maneuvered by the accelerator of the vehicle; if it is in a low position in FIG. 5, it makes it possible to have a voltage of 4 V at the point 56 in the diagram; if it is in a high position on the diagram, then a voltage of 8 V can be obtained at the point 56. The voltage obtained at the point 56 is sent to the positive input of a comparator 57, at the negative input of which a sawtooth voltage varying between 4 and 8 V is applied, this voltage being obtained as will be described below at the point 58 in the diagram. The sawtooth voltage has a period P; during a portion of this period, the value of the voltage obtained at the point 58 on the diagram is greater than that of the voltage obtained at point 56, and in that case a voltage is obtained at the output of the comparator 57, while for the remainder of the period this output is at 0 voltage. Hence at the output 59 of the comparator 57, a rectangular voltage is obtained, the chopping rate of which is a function of the position of the cursor 55, and consequently of the accelerator of the vehicle. This rectangular voltage obtained at the output 59 is sent over a transistor circuit identified overall by reference numeral 60, this circuit having the task of current amplification of the signal it receives from the output 59; at the output to the point 61, that is, to the gates of the transistors 44, the circuit 60 hence furnishes a rectangular signal having the period P and having a sufficiently high value to control the transistors 44.

The supply current of the motors 33–36 is detected by picking up the voltage at the ends of a resistor 61 disposed between the transistors 44 and earth. The mean value of this voltage is obtained with a capacitor 62 and is sent to the negative input of a comparator 63. A setpoint voltage obtained via a rheostat 64 is applied to the positive input of this comparator 63. At the output of the comparator 63, a voltage is obtained that is made to act on the positive input of the comparator 57, to limit the supply current to the motors of the vehicle as a function of the set-point value defined by the rheostat 64.

The following description pertains to the manner in which the sawtooth voltage is obtained at the point 58 of the circuit. To accomplish this, a capacitor 65 disposed between ground and the point 58 of the circuit is charged and discharged, the charging and discharging taking place across a resistor 66 connected between the point 58 and the output of a bistable element 67. The bistable element 67 comprises two NAND gates 68 and 69 looped to one another; that is, the output of one is connected to one of the inputs of the other; one of these input/output connections comprises the output of the bistable element 67, and the terminals of the two gates 68 and 69, which are not used for the looping, and connected to the line 47 via two resistors 70 and 71, the resistance of which equals that of the resistor 66. The point 58 is connected to the negative input of a comparator 72 and to the positive input of a comparator 73; the outputs of the comparators 72 and 73 are connected respectively to the terminals of the gates 68 and 69, which are connected to the line 47. The positive terminal of the comparator 72 is connected to the median point located between the resistors 51 and 52; the negative input of the comparator 73 is connected to the median point located between the resistors 52 and 53.

The function of this assembly is simple to explain. If the output 74 of the bistable element 67 (which is connected to the resistor 66) is in the HIGH state, the capacitor 65 charges until the voltage at the negative input of the comparator 72 exceeds that applied to the positive input. At the moment this happens, the output of the comparator 72 changes to zero, the bistable element 67 switches over to the LOW point, and the voltage at the output 74 of the bistable element assumes the LOW state. As a result, the capacitor 65 discharges. When the voltage applied to the positive input of the comparator 73 becomes less than that applied to the negative input, the voltage at the output of the comparator 73 becomes zero. Consequently, the bistable element 67 switches back again, which puts it in the state that was the point of departure for this explanation. Hence, it can be seen that the voltage at the point 58 of the circuit varies between the voltages of the median points between the resistors 51 and 52, on the one hand, and 52 and 53, on the other, or in other words between 8 and 4 V. The period of sawtooth voltage thus obtained is a function of the charging time of the capacitor 65, and this symmetrical sawtooth voltage is applied to the negative input of the comparator 57, as has been explained above.

Hence it is seen that the circuit shown in FIG. 5, as a function of the position of the cursor 55 connected to the vehicle accelerator, makes it possible to obtain a current at the motors 33-36 the mean value of which varies between 0 and the maximum value imposed by the rheostat 64, and the differential effect is obtained automatically by the connection in series of the two motors of the same wheel and axle set.

Figure 6:
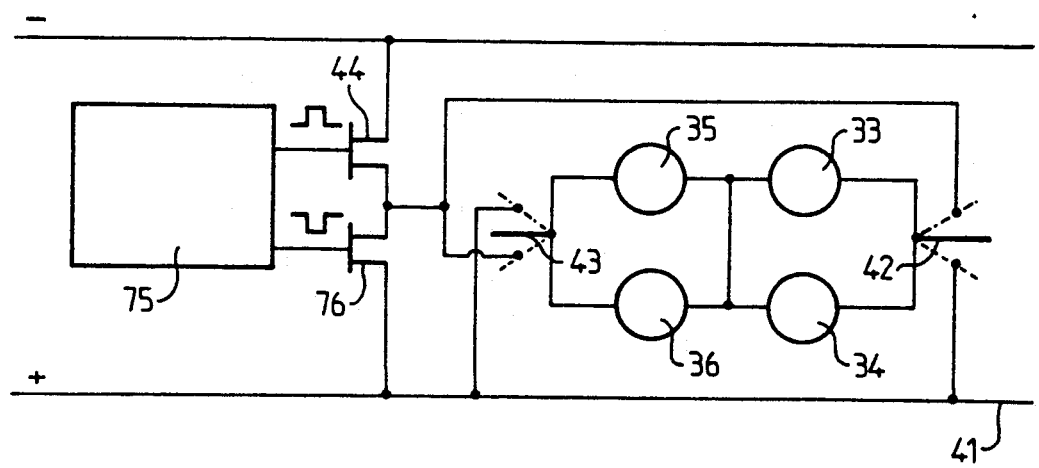
FIG. 6 is a block diagram of an electronic circuit with which a motor brake can be obtained for a vehicle including the power supply of the type shown in FIG. 5.

In FIG. 6, a third variant has been schematically shown for supplying the motors 33-of the vehicle according to the invention. This variant is based on that of FIG. 5 and in the same manner provides for the connection in series of the two motors of the same wheel and axle set to obtain the differential effect. However, it also makes it possible to assure a motor braking function. In fact, with a supply of the foregoing type, if the vehicle is in motion and the accelerator is moved to the minimum position, the supply current to the motors becomes 0, but no braking is manifested, so that if it should become necessary, the vehicle must be slowed down by means of braking devices 21, 24 associated with each wheel. However, a motor brake can be created electrically. In FIG. 6, reference numeral 75 represents a supply current of the type shown in FIG. 5. The circuit 75 supplies the motors 33-36 via MOS transistors 44, as described above. In FIG. 6, only a single supply transistor 44 is shown, to simplify the drawing, but in fact, a plurality of them are naturally used, as noted above. Once again in the diagram of FIG. 6, the two switches 42 and 43 are disposed between the motors and the positive supply line 41, on the one hand, and the motors and the supply transistors 44, on the other. As before, the switches 42 and 43 have a position corresponding to forward travel, shown in dot-dash lines, and a position corresponding to travel in reverse, shown in dotted lines.

By comparison with the previous circuit, the diodes 46 are omitted, and they are replaced with MOS transistors 76 similar to the transistors 44 and equivalent in number. In FIG. 6, only one transistor 76 has been shown for the sake of simplicity, but in practice a plurality of them will be used, connected in parallel. The transistors 76 are in phase opposition with respect to the transistors 44; that is, they are conducting when the transistors 44 are blocked, and vice versa. The transistors 76 connect the output of the switch 43 to the line 41. As a result, when they are conducting, the transistors 76 assure short-circuiting of the armature coils of the motors 33–36, which it will be understood brakes the motor during the period for which the transistors 76 are conducting. In other words, during each period of sawtooth voltage obtained at the point 58 of the circuit 75, there is a fraction of a period during which the motors 33-36 are supplied, and during the fraction complementary to that period, these motors are braked by armature short-circuiting. As a result, if the driver of the vehicle relaxes his pressure on the accelerator, the braking phase will become preponderant over the propulsion phase, and the braking will be permanent if there is no further action exerted on the accelerator, which corresponds to a motor braking effect.

It is appropriate moreover to note that a recovery of energy can be accomplished in the braking phases.

It will be understood that the exemplary embodiments described above are in no way limiting and can undergo any desirable modification without departing from the scope of the invention. In particular, the invention can be applied to golf carts or vehicles of any type, such as vehicles for transporting passengers or baggage in hotels. These vehicles may have more than two wheel and axle sets, particularly if these are all-terrain vehicles.

What is claimed is:

1. A motor vehicle including at least two axles and wheel assemblies [wheel(s) (1a, 1b, 1c, 1d)], one in front and one in the rear of the motor vehicle, at least one of which is driven and at least one of which steers, the power to said vehicle being [assured] supplied by an on-board source of electrical energy, wherein each wheel of the driven axle and wheel assembly is equipped with an electric back-geared motor assembly supplied by the source of electrical energy, said motor assembly being connected to a chassis of the vehicle by two suspension elements articulated on the motor assembly on a first side and on the chassis on a second side, an output shaft of said motor assembly comprising the axle of the corresponding wheel, wherein each axle and wheel assembly includes two wheels that are symmetrical with respect to the median longitudinal plane of the vehicle, and the suspension elements are suspension triangles.

2. A motor vehicle as defined by claim 1, wherein the driven axle and wheel assembly is also a steering assembly, each suspension triangle being articulated on the motor assembly by a ball and on the chassis by a shaft substantially parallel to a longitudinal axis of the vehicle, the group being joined, at a point not located on a straight line joining the centers of the two balls, to a steering device.

3. A motor vehicle as defined by claim 1, wherein each axle and wheel assembly is both a driving and a steering assembly.

4. A motor vehicle as defined by claim 1, wherein a braking device is disposed between the wheel and a gear box of the back-geared motor assembly, a first element of said device being integrally joined to said gear box and a second element of said device being integrally joined with the wheel axle, a braking system being disposed between the first and second elements.

5. A motor vehicle as defined by claim 2, wherein the balls articulating the suspension triangles on the motor assembly are attached to the gear box of a reduction gear of the back-geared motor assembly.

6. A motor vehicle as defined by claim 1, wherein the on-board source of electrical energy is a battery, and a motor of the back-geared motor assembly is a direct current motor.

7. A motor vehicle as defined by claim 6, wherein the motor has an armature coil rotor and an inductor stator having permanent magnets.

8. A motor vehicle as defined by claim 1, wherein a steering box of the vehicle controls an electronic unit including first and second identical subassemblies, the first subassembly being assigned to at least one of the two right wheels and the second subassembly being assigned to at least one of the two left wheels of the vehicle, one of the first and second subassemblies furnishing an electrical supply to at least one of the inside wheels during cornering that is increasingly reduced the more accentuated the curve being traveled, while the other of the first and second subassemblies maintains an electrical supply to at least one of the outer wheels corresponding to driving straight ahead.

9. A motor vehicle as defined by claim 1, wherein the two motor assemblies of each axle and wheel assembly are identical and are electrically supplied in series.

10. A motor vehicle as defined by claim 9, wherein an electrical connection is made between two median points located between the two series-connected motor assemblies of each axle and wheel assembly.

11. A motor vehicle as defined by claim 9, wherein the electrical supply to the motor assemblies is provided by a plurality of supply transistors connected in parallel, the conduction of said transistors being simultaneous and being controlled at a frequency (F) for a fraction $\tau$ of the control period (1/F), $\tau$ being between 0 and 1 and being a function that increases with the control of the vehicle accelerator.

12. A motor vehicle as defined by claim 11, wherein during the fraction $(1-\tau)$ of the control period when the electrical supply to the motor assemblies is cut off, armature coils of the motor assemblies are made to short-circuit.

13. A motor vehicle as defined by claim 12, wherein the armature coils are short-circuited by at least one transistor conducting in phase opposition with respect to the supply transistors that supply the motor assemblies.

* * * * *